(12) United States Patent
Whitehouse et al.

(10) Patent No.: US 10,778,011 B2
(45) Date of Patent: Sep. 15, 2020

(54) POWER TRANSMISSION NETWORKS

(71) Applicant: GENERAL ELECTRIC TECHNOLOGY GMBH, Baden (CH)

(72) Inventors: Robert Whitehouse, Stafford (GB);
Carl D. Barker, Stafford (GB);
Ghirmazion Ghebreyesus, Stafford (GB)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 16/348,459

(22) PCT Filed: Oct. 31, 2017

(86) PCT No.: PCT/EP2017/077892
§ 371 (c)(1),
(2) Date: May 8, 2019

(87) PCT Pub. No.: WO2018/086965
PCT Pub. Date: May 17, 2018

(65) Prior Publication Data
US 2020/0067317 A1 Feb. 27, 2020

(30) Foreign Application Priority Data

Nov. 9, 2016 (EP) ..................................... 16198035

(51) Int. Cl.
*H02J 3/36* (2006.01)
(52) U.S. Cl.
CPC ....................................... *H02J 3/36* (2013.01)

(58) Field of Classification Search
CPC .... H02J 3/36; H02J 3/38; H02J 3/386; H02M 7/7575; H02M 7/66; H02M 7/68; H02M 7/72; H02M 7/757; H02H 7/268
See application file for complete search history.

(56) References Cited

U.S. PATENT DOCUMENTS 4,689,733 A * 8/1987 Guth ......................... H02J 3/36
363/51
10,530,160 B2 * 1/2020 Adamczyk .............. H02J 3/386
(Continued)

FOREIGN PATENT DOCUMENTS

WO 2012/055438 A1 5/2012

OTHER PUBLICATIONS

PCT International Search Report and Written Opinion for PCT Application No. PCT/EP2017/077892 dated Feb. 5, 2018.
(Continued)

*Primary Examiner* — Adolf D Berhane
(74) *Attorney, Agent, or Firm* — Eversheds Sutherland (US) LLP

(57) ABSTRACT

In the field of high voltage direct current (HVDC) power transmission there is provided a power converter assembly (10) comprising a line-commutated power converter (12) that is configured to transfer power from a DC network (14) to a corresponding receiving AC network (16). The power converter assembly (10) also includes a control unit which is operatively associated with the line-commutated power converter (12) and is programmed, in response to the receiving AC network (16) exhibiting a reduced AC voltage ($V_a$, $V_b$, $V_c$), to cause a reduction in the operating DC voltage ($V_{DC}$) of the line-commutated power converter (12) by the DC network (14).

18 Claims, 2 Drawing Sheets

(56) References Cited

U.S. PATENT DOCUMENTS

Figure 1:
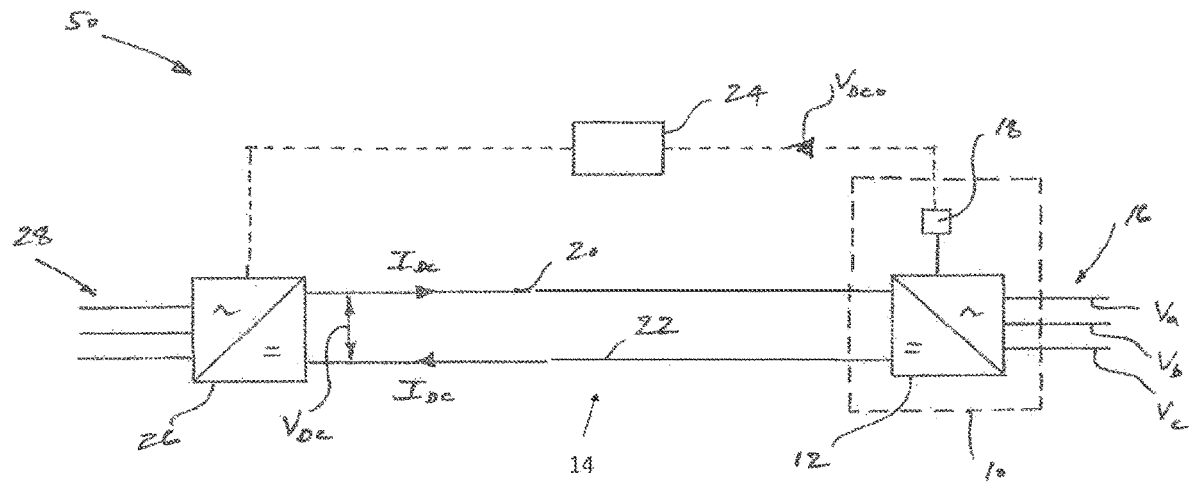

| | | | | |
|---|---|---|---|---|
| 10,601,214 B2* | 3/2020 | Barker | .................... | H02H 3/066 |
| 10,608,434 B2* | 3/2020 | Adamczyk | ................ | H02J 3/38 |
| 2017/0331393 A1* | 11/2017 | Whitehouse | ............ | H02M 7/49 |
| 2018/0145499 A1* | 5/2018 | Gupta | ...................... | H02H 3/16 |
| 2018/0342871 A1* | 11/2018 | Adamczyk | ................ | H02J 3/24 |
| 2019/0296553 A1* | 9/2019 | Tzimas | ..................... | H02J 3/36 |
| 2019/0305669 A1* | 10/2019 | Gupta | ....................... | H02J 3/36 |
| 2020/0059095 A1* | 2/2020 | Adamczyk | ............... | H04B 3/54 |

OTHER PUBLICATIONS

Xia Chen et al. : "LCC based MTDC for grid integration of large onshore wind farms in Northwest China", Power and Energy Society General Meeting, 2011 IEEE, IEEE, Jul. 24, 2011 (Jul. 24, 2011)—pp. 1-10 XP032055089.

Zeng Rong et al. : "Hybrid HVDC for Integrating Wind Farms with Special Consideration on Commutation Failure", IEEE Transactions on Power Delivery, IEEE Service Center, New York, NY, US, vol. 31, n°2, Apr. 1, 2016 (Apr. 1, 2016), pp. 789-797, XP011604128.

Response to EPO Office Action dated May 22, 2018 and filed Nov. 14, 2019.

European Search Report dated May 22, 2017.

* cited by examiner

POWER TRANSMISSION NETWORKS

CROSS-REFERENCE TO RELATED APPLICATIONS

This application is a U.S. National Stage Application under 35 U.S.C. 371 and claims the priority benefit of International Application No. PCT/EP2017/077892 filed Oct. 31, 2017 which claims priority to EP16198035.4, filed Nov. 9, 2016, which are incorporated herein by reference.

This invention relates to a power converter assembly, for use in a high voltage direct current (HVDC) power transmission network, and to such a power transmission network.

In HVDC power transmission, alternating current (AC) electrical power is converted to high voltage direct current (DC) power for transmission via overhead lines and/or undersea cables. This conversion reduces the cost per kilometre of the lines and/or cables, and is therefore cost-effective when power needs to be transmitted over a long distance. Once the transmitted electrical power reaches its target destination, the high voltage DC electrical power is converted back to AC electrical power before being distributed to local networks.

The conversion of AC power to DC power is also commonly utilized in power transmission networks in circumstances where it is necessary to interconnect two or more AC networks operating at different frequencies.

HVDC power converters are required at each interface between AC and DC networks to effect the required conversion between AC power and DC power.

According to a first aspect of the invention there is provided a power converter assembly, for use in a high voltage direct current (HVDC) power transmission network, comprising:
- a line-commutated power converter configured to transfer power from a DC network to a corresponding receiving AC network; and
- a control unit operatively associated with the line-commutated power converter, the control unit being programmed, in response to the receiving AC network exhibiting a reduced AC voltage, to cause a reduction in the operating DC voltage of the line-commutated power converter by the DC network.

A reduction in the AC voltage of a receiving AC network, such as might arise as a result of switching disturbances or faults within the receiving AC network, has a tendency to cause a failure in the commutation of one or more line-commutated switching elements in the corresponding line-commutated power converter with which it is operatively connected. Such a commutation failure rapidly progresses into a DC short circuit across the line-commutated power converter which in turn leads temporarily to a collapse in the DC voltage reaching the line-commutated power converter and a loss of power transmission from a DC network with which the affected line-commutated power converter is in use connected to the faulty receiving AC network. Moreover, the disturbance caused by the temporary collapse of the DC voltage leads to a surge in current from one or more other power converters that are operatively connected with the said DC network and configured to provide the said DC voltage to the affected line-commutated power converter. Since such other power converters provide the DC voltage by transferring power to the DC network from a corresponding sending AC network with which they are also operatively connected, the surge in current in turn undesirably disturbs the or each sending AC network and affects equipment connected therein.

The inclusion in the power converter assembly of the invention of a control unit which is programmed to cause a reduction in the operating DC voltage of the line-commutated power converter in response to the receiving AC network corresponding to the said power converter exhibiting a reduced AC voltage, advantageously reduces, and in some instances eliminates, the risk of subsequent commutation failures occurring within the affected line-commutated converter while the corresponding receiving AC network remains faulty, i.e. while the receiving AC network continues to exhibit a reduced AC voltage.

In a preferred embodiment of the invention the control unit is programmed to cause a reduction in the operating DC voltage of the line-commutated power converter to prevent subsequent commutation failures occurring within the line-commutated power converter.

The prevention of subsequent commutation failures desirably helps to avoid unwanted disruption to other areas of a power transmission network in which the power converter assembly of the invention is located.

Preferably the control unit is programmed to cause a reduction in the operating DC voltage of the line-commutated converter which is proportional to the reduction in the AC voltage in the corresponding receiving AC network.

Such a control unit requires only a simple modification to the overall control strategy for the power converter while still providing the benefit of substantially reducing the risk of subsequent commutation failures in the power converter while the corresponding receiving AC network remains faulty.

Optionally the control unit is programmed to take into account one or more of the following when causing a reduction in the operating DC voltage of the line-commutated power converter:
- a change in DC current provided to the line-commutated converter;
- a change in AC current within the corresponding faulty receiving AC network; and
- a change to the extinction angle order provided to each line-commutated switching element in the line-commutated converter.

Programming the control unit in the foregoing manner desirably provides an increased degree of control, which is representative of further operating characteristics of a power transmission network within which the power converter assembly is in use located, to the extent to which the operating DC voltage of an affected line-commutated converter is reduced.

Preferably the control unit is programmed to establish a reduced DC voltage demand order ($V_{DCO}$) which tracks the AC voltage in the corresponding receiving AC network.

Such a feature assists in reliably and accurately controlling the reduced operating DC voltage of the line-commutated power converter.

In another preferred embodiment of the invention the control unit takes the form of a local control unit which directly controls the operating DC voltage of the line-commutated power converter according to the reduced DC voltage demand order it establishes.

The local control unit (18) may be further programmed to dispatch the reduced DC voltage demand order ($V_{DCO}$) to:
(i) a higher level controller (24) configured to coordinate and control the operation of one or more other power converters (26) configured to provide a DC voltage ($V_{DC}$) to the line-commutated power converter (12); or (ii) a local control unit of one or more other power converters (26) configured to provide a DC voltage ($V_{DC}$) to the line-commutated power converter (12).

The foregoing features help the control unit to optionally form a part of the line-commutated converter with which it is operatively associated such that the power converter assembly formed of the said control unit and line-commutated converter is a self-contained entity which may thereafter be configured to operate within a power transmission network including third party power converters and other control systems.

In a still further preferred embodiment of the invention the control unit takes the form of a higher level controller which indirectly controls the operating DC voltage of the line-commutated power converter according to the reduced DC voltage demand order it establishes.

Optionally the higher level controller is configured to coordinate and control the operation of one or more other power converters configured to provide a DC voltage to the line-commutated power converter.

Such features desirably extend the benefits of the invention to other power transmission network topologies.

In a preferred embodiment of the invention the control unit is configured to receive data indicative of the magnitude of the AC voltage in the corresponding receiving AC network.

The data preferably includes one or more of:
an average AC voltage level; and
a peak voltage level.

Optionally, in embodiments in which the corresponding receiving AC network is a multi-phase network, the data includes:
a single multi-phase line to line voltage measurement; or
separate single phase line to line voltage measurements.

The foregoing features allow the control unit to operative effectively with a wide range of line-commutated power converter and receiving AC network configurations.

According to a second aspect of the invention there is provided a power transmission network comprising a power converter assembly according to any proceeding claim and one or more other power converters configured to transfer power from a corresponding sending AC network to the line-commutated power converter of the power converter assembly via an interconnecting DC network.

Such an arrangement expands the benefits of the invention to power transmission networks more generally.

A further preferred power transmission network includes at least one further line-commutated power converter.

Optionally one or more of the further line-commutated power converters is operatively associated with a control unit programmed, in response to the receiving AC network of the corresponding further line-commutated converter exhibiting a reduced AC voltage, to cause a reduction in the operating DC voltage of the corresponding line-commutated power converter.

The foregoing features expand still further the benefits of the invention to a wide range of different power transmission network topologies.

Figure 2:
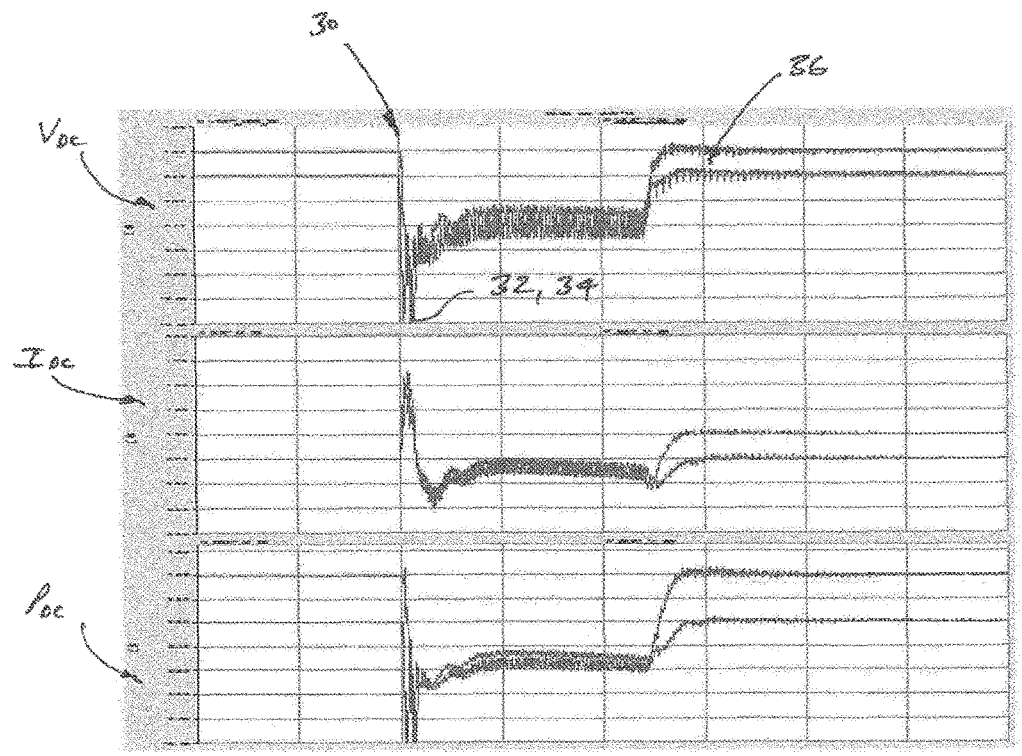
Figure 3:
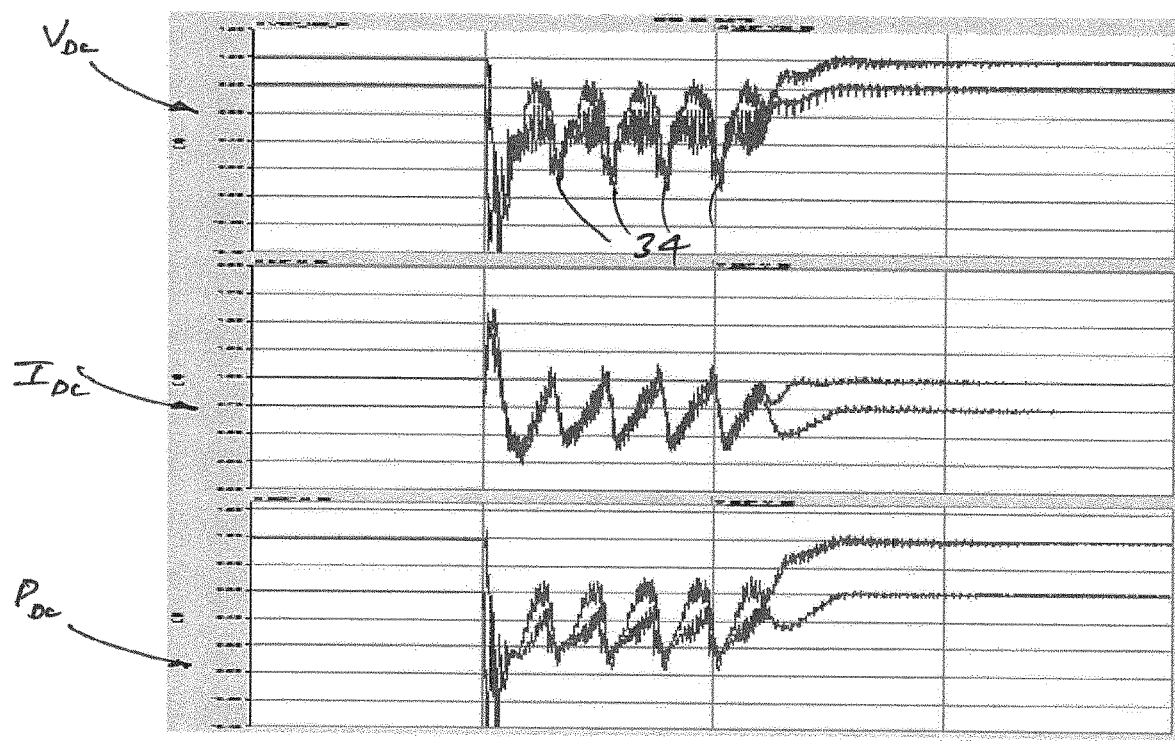

There now follows a brief description of preferred embodiments of the invention, by way of non-limiting example, with reference being made to the following figures in which:

FIG. 1 shows a schematic view of a power converter assembly according to a first embodiment of the invention which forms a part of a power transmission network according to a further embodiment of the invention;

FIG. 2 illustrates changes to DC voltage, DC current, and DC power transfer levels within a line-commutated power converter which forms a part of the power converter assembly shown in FIG. 1, when a corresponding receiving AC network exhibits a reduced AC voltage; and FIG. 3 illustrates changes to DC voltage, DC current, and DC power transfer levels within a conventional line-commutated power converter not having a control unit according to the invention operatively associated therewith.

A power converter assembly according to a first embodiment of the invention is designated generally by reference numeral 10, as shown schematically in FIG. 1.

The power converter assembly 10 includes a line-commutated power converter 12 which is configured to transfer power from a DC network 14 to a corresponding receiving AC network 16.

In addition the power converter assembly 10 includes a control unit which is operatively associated with the line-commutated power converter 12. More particularly, in the embodiment shown, the control unit takes the form of a local control unit 18 that is a part of the line-commutated power converter 12 and directly controls the operating DC voltage ($V_{DC}$) of the line-commutated power converter 12.

In other embodiments of the invention the local control unit 18 could be spaced from the line-commutated power converter 12, and may even be in a location remote from the line-commutated power converter 12.

In any event, the local control unit 18 is programmed, in response to the receiving AC network 16 exhibiting a reduced AC voltage $V_a$, $V_b$, $V_c$, to cause a reduction in the operating DC voltage $V_{DC}$ of the line-commutated power converter 12.

In the embodiment shown the local control unit 18 is programmed to cause a reduction in the operating DC voltage $V_{DC}$ of the line-commutated power converter 12 which is proportional to the reduction in the AC voltage $V_a$, $V_b$, $V_c$ in the receiving AC network 16.

More particularly the local control unit 18 is programmed to establish a reduced DC voltage order $V_{DCO}$ which tracks the AC voltage $V_a$, $V_b$, $V_c$ of the receiving AC network 16 according to the following:

$$V_{DCO}=1.35 \cdot E_{\|} \cdot (\cos(\gamma) - I_{DC} \cdot X_c/2)$$

where,
$V_{DCO}$ is the reduced DC Voltage order established by the local control unit 18;
$E_{\|}$ is indicative of the magnitude of the AC voltage $V_a$, $V_b$, $V_c$ of the receiving AC network 16;
$\gamma$ is the extinction angle order provided to each line-commutated switching element in the line-commutated power converter 12;
$I_{DC}$ is the DC current provided to the line-commutated power converter 12 by the DC network 14; and
$X_c$ is the commutation reactance of the line-commutated power converter 12.

By way of example, the line-commutated power converter 12 is shown operatively connected to a DC network 14 having first and second DC transmission conduits 20, 22 in the form of respective overhead transmission lines, although this need not necessarily be the case and other DC transmission conduits 20, 22 may be used such as underground cables. In the embodiment shown the DC current $I_{DC}$ provided to the line-commutated power converter 12 flows into the line-commutated power converter 12 through the first DC transmission conduit 20 and out of the line-commutated power converter 12 through the second DC transmission conduit 22, while the DC voltage $V_{DC}$ actually provided to the line-commutated power converter 12 is the voltage difference between the first and second DC transmission conduits 20, 22. Other DC network configurations may, however, be employed.

Returning to the example embodiment shown the receiving AC network 16 is a three phase a, b, c network and so the indicative magnitude $E_{\parallel}$ of the AC voltage $V_a$, $V_b$, $V_c$ is obtained by the local control unit 18 in the form of a single multiphase line to line voltage measurement which, additionally, is averaged by taking the Root Mean Square (RMS) value. In other embodiments of the invention the local control unit 18 may instead be configured to receive, i.e. obtain, data indicative of the magnitude $E_{\parallel}$ of the AC voltage $V_a$, $V_b$, $V_c$ in the receiving AC network 16 in the form of separate single phase a, b, c line to line voltage measurements which may or may not be averaged, e.g. by taking the RMS value. Still further indicative magnitudes may be used such as, for example, one or more peak voltage levels.

Meanwhile the extinction angle γ (i.e. the time between current extinguishing in a given line-commutated switching element, e.g. a thyristor, or series-connected string of switching elements within the line-commutated power converter 12 resulting in the or each switching element being exposed to a reverse polarity voltage, and the subsequent re-application of a positive voltage across the or each switching element) has to be greater than a specified minimum time such as 350 μs (or 7° in a power converter operating at 50 Hz). To maintain an adequate extinction angle under normal operating conditions and within the accuracy of the parameter measurements and performance capabilities of, e.g. the local control unit 18, a margin is added to this minimum requirement. In practice the extinction angle order for, e.g. the local control unit 18 is typically 15° for a converter operating in a 50 Hz system.

In still further embodiments of the invention (not shown) the local control unit may be programmed to additionally take into account a change in the AC current within the receiving AC network 16 when establishing the DC voltage order $V_{DCO}$ mentioned above.

Once the local control unit 18 has established a reduced DC voltage order $V_{DCO}$ it is programmed, in the embodiment shown, to then control directly the operating DC voltage $V_{DC}$ of the line-commutated power converter 12 according to the reduced DC voltage demand $V_{DCO}$ it has established.

In addition to the foregoing, the local control unit 18 is also programmed, although this need not necessarily be the case, to dispatch the reduced DC voltage order $V_{DCO}$ to a second control unit which takes the form of a higher level controller 24.

The higher level controller 24 coordinates and controls the operation of the line-commutated power converter 12 and another power converter 26 that is configured to transfer power from a corresponding sending AC network 28 to the DC network 14 which interconnects the line-commutated power converter 12 and the other power converter 26 and thereby provided a DC voltage $V_{DC}$ to the line-commutated power converter 12. In this way the line-commutated power converter 12 and its associated local control unit 18, the other power converter 26 and the DC network 14 define a power transmission network 50 according to an embodiment of the invention.

Once the higher level controller 24 receives the reduced DC voltage order $V_{DCO}$ from the local control unit 18 it controls the other power converter 26 to reduce the DC voltage $V_{DC}$ it produces which in turn reduces the DC voltage $V_{DC}$ within the interconnecting DC network 14 and thereby reduces the level of DC voltage $V_{DC}$ provided to the line-commutated power converter 12. Such control by the higher level controller 24 of the other power converter 12 may be directly or via another control unit (not shown), e.g. another local control unit, operatively associated with the other power converter 26.

Operation of the line-commutated power converter 12, and more particularly the changes in the DC voltage $V_{DC}$, DC current $I_{DC}$, and DC power transfer PDC levels within it, when the corresponding receiving AC network 16 exhibits a reduced AC voltage, i.e. when the indicative magnitude $E_{\parallel}$ of the AC voltage $V_a$, $V_b$, $V_c$ of the receiving AC network 16 falls, is shown in FIG. 2.

When the indicative magnitude $E_{\parallel}$ of the AC voltage $V_a$, $V_b$, $V_c$ in the receiving AC network 16 initially falls 30, e.g. because of a fault in the receiving AC network 16, a commutation failure 32 occurs in one or more of the line-commutated switching elements within the line-commutated power converter 12. This causes a temporary DC short circuit across the line-commutated power converter 12 which in turn leads temporarily to a collapse in the DC voltage $V_{DC}$ reaching the line-commutated power converter 12, a spike in the DC current $I_{DC}$ passing through the power converter 12 from the other power converter 26 and a loss of DC power transmission PDC from the DC network 14 to the receiving AC network 16.

Thereafter the line-commutated power converter 12 recovers to operate at a reduced DC voltage level equal to the reduced DC voltage order $V_{DCO}$ established by the local control unit 18 and, crucially, no further commutation faults occur within the power converter 12 (as would be evidenced by further collapses 34 in the DC voltage $V_{DC}$, e.g. as is shown by way of example in FIG. 3 which illustrates the changes in the DC voltage $V_{DC}$, DC current $I_{DC}$, and DC power transfer PDC levels within a conventional line-commutated power converter not having a control unit according to the invention operatively associated therewith).

Once the fault clears within the receiving AC network 16, which typically might be within 100 ms to 300 ms, the indicative magnitude $E_{\parallel}$ of the AC voltage $V_a$, $V_b$, $V_c$ in the receiving AC network 16 increases back to its pre-fault level and hence the DC voltage order established by the local control unit 18 (which tracks the said indicative magnitude $E_{\parallel}$) increases also such that the operating DC voltage $V_{DC}$ of the line-commutated power converter 12 returns also to its pre-fault level 36.

In other embodiments of the invention (not shown) the control unit that establishes a reduced DC voltage demand order may instead take the form of a higher level controller which indirectly controls the operating DC voltage of the line-commutated power converter, e.g. via an associated local control, according to the said reduced DC voltage demand order it has established. Such a higher level controller may also additionally be configured to coordinate and control the operation of one or more other power converters which are themselves configured to provide a DC voltage to the line-commutated power converter.

Power transmission networks according to other embodiments of the invention may include one or more further line-commutated power converters.

One or more such further line-commutated power converters may be operatively associated with a control unit which is programmed, in response to the receiving AC network of the corresponding further line-commutated converter exhibiting a reduced AC voltage, to cause a reduction in the operating DC voltage of the corresponding line-commutated power converter.

The invention claimed is:

1. A power converter assembly, for use in a high voltage direct current (HVDC) power transmission network, comprising:
   a line-commutated power converter configured to transfer power from a DC network to a corresponding receiving AC network; and
   a control unit operatively associated with the line-commutated power converter, the control unit being programmed to:
     identify a commutation failure in the line-commutated power converter; and
     send, based on an identified commutation failure, an instruction to reduce the operating DC voltage ($V_{DC}$) of the line-commutated power converter.

2. The power converter assembly according to claim 1 wherein the control unit is programmed to cause a reduction in the operating DC voltage ($V_{DC}$) of the line-commutated converter which is proportional to the reduction in the AC voltage ($V_a$, $V_b$, $V_c$) in the corresponding receiving AC network.

3. The power converter assembly according to claim 1 wherein the instruction to reduce the operating DC voltage ($V_{DC}$) of the line-commutated power converter is based on at least one of:
   a change in DC current ($I_{DC}$) provided to the line-commutated converter;
   a change in AC current within the corresponding faulty receiving AC network; or
   a change to the extinction angle ($\gamma$) order provided to each line-commutated switching element in the line-commutated converter.

4. The power converter assembly according to claim 1 wherein the control unit is programmed to establish a reduced DC voltage demand order ($V_{DCO}$) which tracks the AC voltage ($V_a$, $V_b$, $V_c$) in the corresponding receiving AC network.

5. The power converter assembly according to claim 4 wherein the control unit takes the form of a local control unit which directly controls the operating DC voltage ($V_{DC}$) of the line-commutated power converter according to the reduced DC voltage demand order ($V_{DCO}$).

6. The power converter assembly according to claim 5 wherein the local control unit is further programmed to dispatch the reduced DC voltage demand order ($V_{DCO}$) to:
   (i) a higher level controller configured to coordinate and control the operation of one or more other power converters configured to provide a DC voltage ($V_{DC}$) to the line-commutated power converter; or
   (ii) a local control unit of one or more other power converters configured to provide a DC voltage ($V_{DC}$) to the line-commutated power converter.

7. The power converter assembly according to claim 4 wherein the control unit takes the form of a higher level controller which indirectly controls the operating DC voltage ($V_{DC}$) of the line-commutated power converter according to the reduced DC voltage demand order ($V_{DCO}$) it establishes.

8. The power converter assembly according to claim 7 wherein the higher level controller is configured to coordinate and control the operation of one or more other power converters configured to provide a DC voltage ($V_{DC}$) to the line-commutated power converter.

9. The power converter assembly according to claim 1 wherein the control unit is configured to receive data indicative of the magnitude ($E_{ll}$) of the AC voltage ($V_a$, $V_b$, $V_c$) in the corresponding receiving AC network.

10. The power converter assembly according to claim 9 wherein the data includes one or more of:
    an average AC voltage level; and
    a peak voltage level.

11. The power converter assembly according to claim 9 wherein the corresponding receiving AC network is a multi-phase (a, b, c) network and the data includes:
    a single multi-phase line to line voltage measurement; or
    separate single phase line to line voltage measurements.

12. The power transmission network comprising a power converter assembly according to claim 1 and one or more other power converters configured to transfer power from a corresponding sending AC network to the line-commutated power converter of the power converter assembly via an interconnecting DC network.

13. The power transmission network according to claim 12 further including at least one further line-commutated power converter.

14. The power transmission network according to claim 13 wherein the at least one further line-commutated power converter is operatively associated with a control unit programmed, in response to the receiving AC network of the corresponding further line-commutated converter exhibiting a reduced AC voltage, to cause a reduction in the operating DC voltage of the corresponding line-commutated power converter.

15. A method comprising:
    transferring, by a line-commutated power converter, power from a DC network to a corresponding receiving AC network;
    identifying a commutation failure in a line-commutated power converter; and
    sending, based on identifying the commutation failure, an instruction to reduce the operating DC voltage ($V_{DC}$) of the line-commutated power converter.

16. The method of claim 15, further comprising:
    causing, via the control unit, a reduction in the operating DC voltage ($V_{DC}$) of the line-commutated converter which is proportional to the reduction in the AC voltage ($V_a$, $V_b$, $V_c$) in the corresponding receiving AC network.

17. The method of claim 15, wherein
    based at least in part on one or more of the following when causing the reduction in the operating DC voltage ($V_{DC}$) of the line-commutated power converter:
      a change in DC current ($I_{DC}$) provided to the line-commutated converter;
      a change in AC current within the corresponding faulty receiving AC network; and
      a change to the extinction angle ($\gamma$) order provided to each line-commutated switching element in the line-commutated converter.

18. The method of claim 15, further comprising:
    establishing, via the control unit, a reduced DC voltage demand order ($V_{DCO}$) which tracks the AC voltage ($V_a$, $V_b$, $V_c$) in the corresponding receiving AC network.

* * * * *